Figure 1:
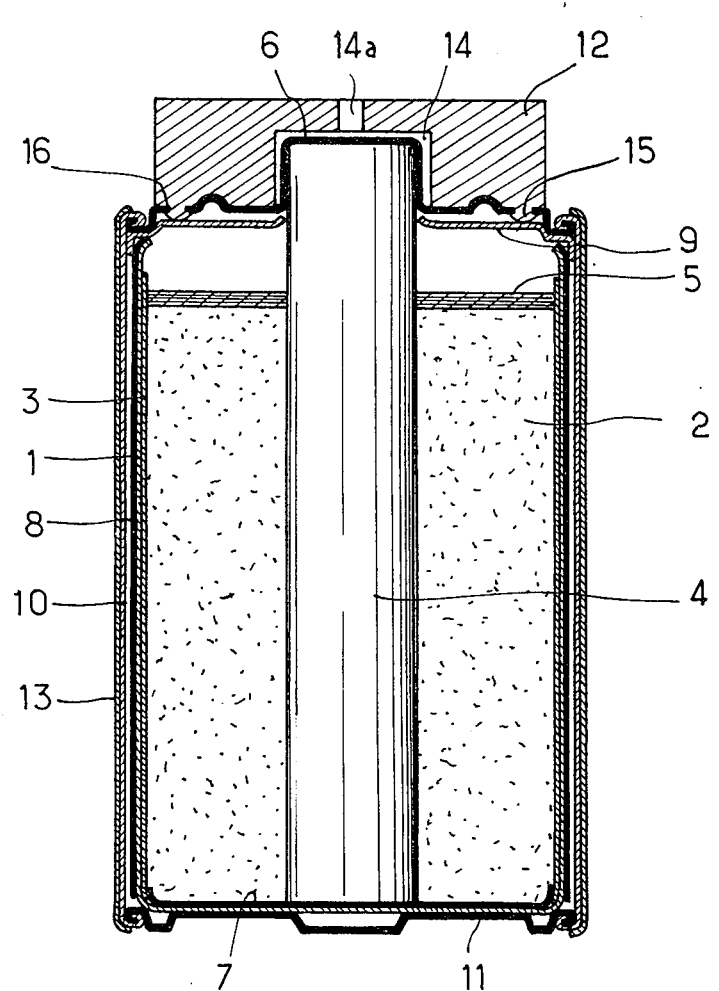

United States Patent [19]
Garcin

[11] 3,948,683
[45] Apr. 6, 1976

[54] ELECTRIC GENERATORS PARTICULARLY DRY CELL BATTERIES

[76] Inventor: Maurice M. Garcin, 9, rue de la Moselle, Paris 19eme, France

[22] Filed: Oct. 16, 1973

[21] Appl. No.: 406,826

[30] Foreign Application Priority Data
Oct. 20, 1972 France .............................. 72.37208

[52] U.S. Cl. ................ 136/107; 136/112; 136/169; 136/181
[51] Int. Cl.² .......................................... H01M 6/06
[58] Field of Search.... 136/107, 102, 106, 112–114, 136/90, 131–135, 167, 169, 170, 175, 181

[56] References Cited
UNITED STATES PATENTS

| | | | |
|---|---|---|---|
| 2,051,987 | 8/1936 | Domizi............................ | 136/114 X |
| 3,228,801 | 1/1966 | Snyder.............................. | 136/113 |
| 3,275,477 | 9/1966 | Schmid-Wildy................. | 136/107 X |
| 3,320,096 | 5/1967 | Jammet............................. | 136/170 |
| 3,366,512 | 1/1968 | Jammet............................. | 136/181 |
| 3,376,166 | 4/1968 | Hruden........................... | 136/107 X |
| 3,473,964 | 10/1969 | Leftault, Jr. ..................... | 136/169 |
| 3,473,965 | 10/1969 | La Barge ........................ | 136/169 |
| 3,490,951 | 1/1970 | George ........................... | 136/107 |
| 3,643,834 | 2/1972 | Sabatino......................... | 136/114 X |
| 3,753,781 | 8/1973 | Parker et al..................... | 136/107 |

Primary Examiner—G. L. Kaplan
Assistant Examiner—C. F. LeFevour
Attorney, Agent, or Firm—Roylance, Abrams, Berdo & Kaul

[57] ABSTRACT

A protective cap affixed to a dry cell to be removed before use includes a disc-like cap covering the exposed electrode at one end of the cell. Axial protrusions on one face of the disc extend through holes in the end face surrounding the electrode, the protrusions being deformed while in a plastic state so as to be not removable without breakage. The cap is removed by fracturing the protrusions with a rotary motion. In another embodiment a single annular flange fits in an annular groove around the electrode. Yet another embodiment includes axial and radial projections to adopt to the specific form of battery case design. A further embodiment includes a two-part cap with one externally threaded and molded onto the electrode, and the other internally threaded and screwed onto the first. Removal is effected by tightening the second which breaks the first loose.

11 Claims, 12 Drawing Figures

ELECTRIC GENERATORS PARTICULARLY DRY CELL BATTERIES

The present invention relates to an electric generator, particularly a dry cell, one of the poles of which is formed by a central electrode projecting out of a holder closed on all sides.

In electric generators and more particularly in dry cells, it is normal practice to conceal almost all of at least one of the poles with a protective element which must be torn or cut at the time of use, the presence of said element in an undamaged state assuring the purchaser that the device is new.

Hitherto these protective elements have been made in the form of a narrow strip of paper covering the poles or a cap or cover of plastics material, the shape of which follows the exact shape of the pole thus insulated.

The narrow strips of paper have the disadvantage of being fragile and can therefore by accidentally torn. As for the known caps made of plastics material, their removal necessitates the use of a tool.

The object of the present invention is to overcome these disadvantages and for this purpose the generator forming the object of the invention is characterised in that it comprises a protective element formed by a piece of plastics material, the cross-section of which is adjacent to that of the generator and which comprises, on the one hand, a recess for receiving the free end of the central electrode and, on the other hand, anchoring means connecting the said element to the generator, the periphery of the piece of plastics material prohibiting access to the said anchoring means.

The generator is therefore provided with a protective element which is both resistant and easily detachable by hand at one and the same time. Indeed its dimensions enable it to be gripped easily between the thumb and index finger, and separated from the generator by imparting a rotary or pulling movement thereto, as the case may be, which causes the breaking of the anchoring means. Moreover, as the cross-section of the protective element is relatively large, it is possible for markings or information relating to the nature of the generator to be applied to its upper face to permit identification, depending on whether it is stored in a vertical or horizontal position.

Figure 2:
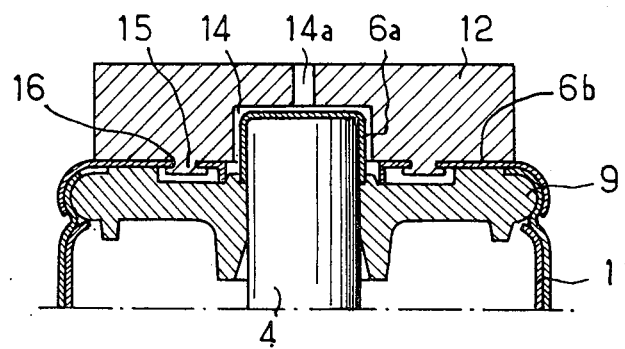
Figure 3:
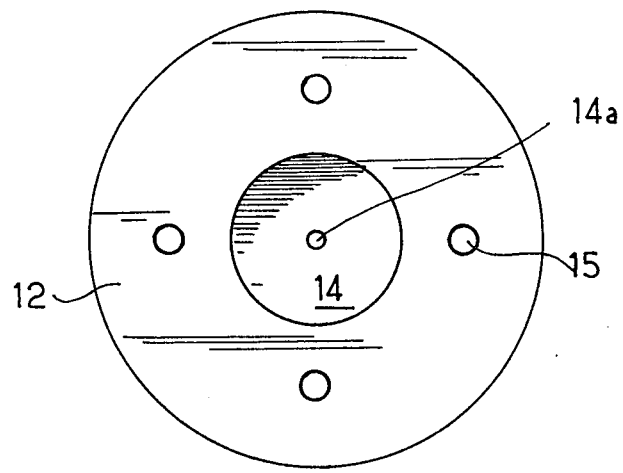
Figure 4:
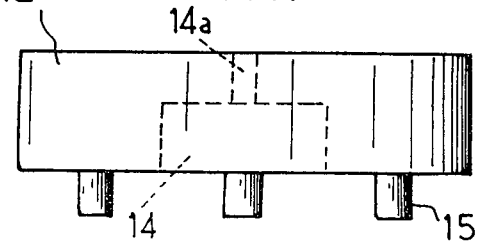

Several embodiments of the invention are described below with reference to the accompanying drawings in which:

FIG. 1 is a longitudinal section through a dry cell showing a first embodiment of the invention, FIG. 2 is a partial section through a second embodiment, FIG. 3 is an underneath view of the safety or protective element provided in the embodiment shown in FIG. 2, FIG. 4 is an elevation of the protective element of the embodiment shown in FIG. 2, and FIGS. 5 to 12 are partial sections through five other embodiments.

With reference to FIG. 1, a dry cell is shown comprising a metal holder 1 forming the anode and separated from the depolarizing medium 2 forming the cathode by a diaphragm 3. A central electrode 4 is immersed in the depolarizer 2 the surface of which is covered by a cardboard disc 5. The upper end of the electrode 4 is covered by a metal dish or cup 6 which constitutes the positive pole of the cell and the lower end of the said electrode rests on an insulating ring 7 which lines the bottom of the holder 1. The holder, the side of which is covered by a casing of plastics material 8, is closed at its upper end by a cover 9 which is also made of plastics material and clamped in position between, on one side, the curved end of the holder and, on the other side, the edge of the metal dish 6 and the upper edge of a cardboard tube 10 enclosing the said holder. The lower edge of this same tube secures a second metal dish 11 of the unit which bears against the bottom of the holder 1 and forms the negative pole of the cell. Finally, a metal jacket 13 encloses the cardboard tube 10. In accordance with the invention the positive pole of the cell is concealed by a protective element 12 in which there is provided a recess 14 for receiving the free end of the central electrode, a recess which is connected to the exterior by a channel 14a. The protective means 12 is provided with two annular projections 15 which can be received in openings 16 provided in the metal dish 6.

The protective element 12 is connected to the metal dish 6 by introducing the projections 15 into the openings 16 and forcing the free ends of these projections, when hot, against the metal dish 6.

In order that the cell may be used, it is necessary to remove the protective element. For this purpose, a rotary movement is imparted to the protective means 12 so as to break the annular projections at a point where they pass through the metal dish. The protective element 12 is therefore no longer retained on the cell and can be removed therefrom. The channel 14a serves to confirm the condition of the cell during storage or at the time of purchase.

The embodiment shown in FIGS. 2, 3 and 4 is a modification of the embodiment shown in FIG. 1. In this case, the free end of the central electrode 4 and the cover 9 are no longer covered by a common metal dish, but by a cap 6a and a so-called dish 6b. Moreover, the shape of the cover is slightly modified. In its conception, design, assembly and removal, the protective element does not differ from the embodiment shown in FIG. 1.

Figure 5:
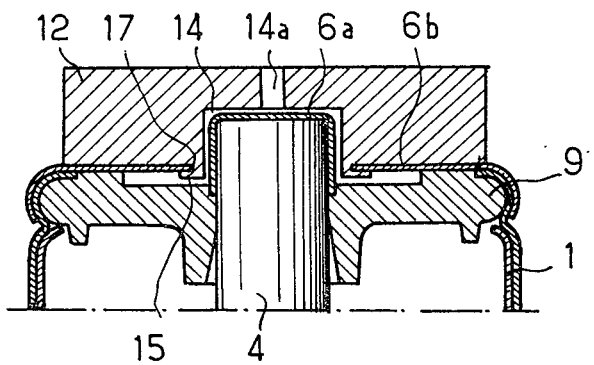

The embodiment shown in FIG. 5 differs from the preceding embodiment in that the openings provided in the dish 6b for the passage of the projections 15 of the protective element 12 combine with that opening which permits the free passage of the electrode. In this case there are provided two or more annular projections 15 on the protective element 12 and as many slots or grooves 17 on the periphery of the central opening in the said dish 6b. The protective element 12 is connected to the dish by placing the projections 15 in the corresponding slots 17 and pressing them when hot against the metal dish 6b.

As in the previous cases, the protective element is removed at the time of use by imparting a rotary movement thereto which causes the rupture of the projections 15 at the point where they pass through the dish 6b.

Instead of separate projections 17 it is also possible to provide, in the embodiment in FIG. 5, an annular protuberance which is placed in the central opening in the dish 6b and pressed when hot against the said dish, thereby rendering the latter integral with the protective element 12.

In this case, to remove the protective element, the annular protuberance is broken by being torn at the point where it passes through the dish 6b.

Figure 6:
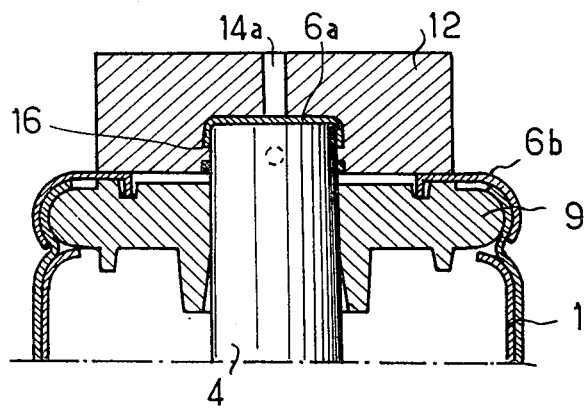

The embodiment shown in FIG. 6 differs from the preceding embodiments in the sense that the openings 16 are provided in the cap 6a and the protective element 12 is secured to the said cap 6a by moulding, an operation during which the material of the protective element becomes inlaid in the openings 16. The cap 6a, covered by the protective element 12, is mounted on the central electrode 4 and rendered integral therewith by clamping.

Imparting a rotary movement to the protective element causes the breakage of the plastics material which has penetrated into the openings 16, as a result of which the said element can be removed.

Figure 7:
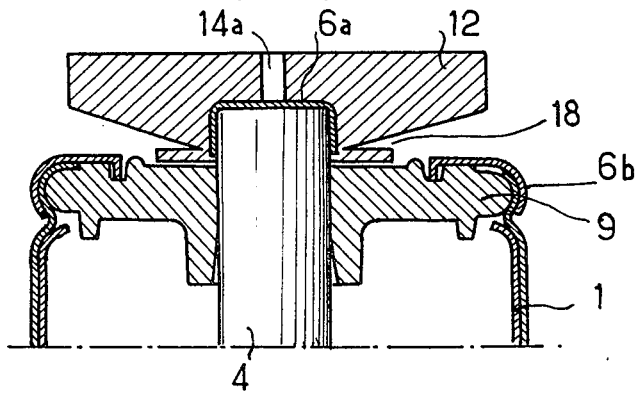

In the case of the embodiment shown in FIG. 7, the protective element 12 is also moulded on to the cap 6a, but the latter does not comprise an opening 16. On the other hand, the moulding extends beyond the lower edge of the said cap 6a and the protective element comprises a circular section 18 of reduced thickness. Prior to use, the plastics material is broken on a level with the reduced section 18 by imparting a rotary or tearing movement to the protective element.

Figure 8:
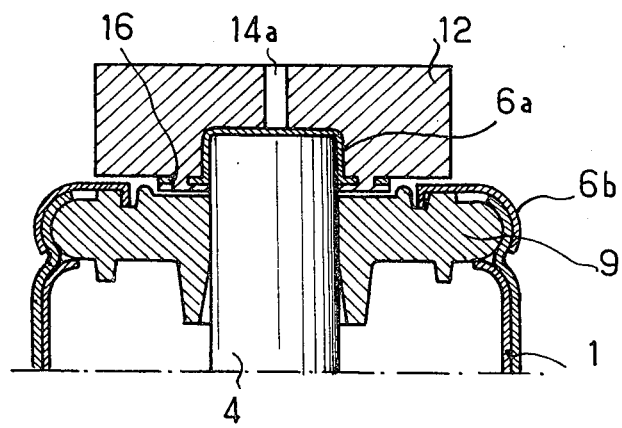

The embodiment shown in FIG. 8 is approximately the same as that in FIG. 6. The only difference is that the openings 16 are not provided in the cylindrical part of the cap 6a, but on a base provided on the latter.

Prior to use, the protective element is removed by a rotary movement which has the effect of breaking the plastics material on a level with the holes in the base of the cap.

Figure 9:
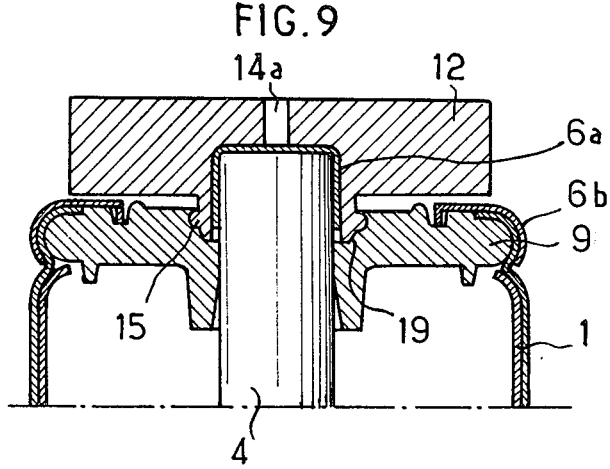

In the case of the embodiment shown in FIG. 9, the protective element 12 and the cover 9 are made of plastics material, the first preferably of a hard and brittle material, such as polystyrene, and the second of a flexible material, such as polyethylene.

The upper part of the cover 9 comprises a central hollow or recess 19 and the protective element 12 an annular projection 15, the shape of which corresponds to that of the central recess 19 in which the projection snap engages.

Prior to use, it is necessary to pull the protective element 12 in order that the said element may be removed by tearing or the snap-engaged projection may break, which also has the effect of releasing the positive pole of the cell.

Figure 10:
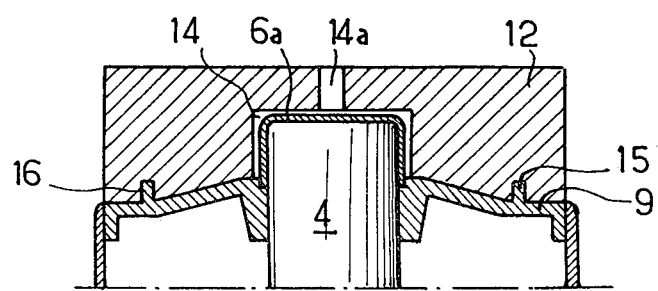

The embodiment shown in FIG. 10 applies only to cells with upper parts made of plastics material and forming a cover 9.

The cover 9 is provided with one or several upwardly directed projections 15 the shape of which corresponds to that of the recesses 16 provided in the protective element 12.

The assembly of the protective element 12 and cover 9 is effected by introducing the projections 15 into the recesses 16 and adhesively fixing or welding the said projections therein.

Prior to use, the protective element 12 is removed by imparting a rotary movement thereto which results in the breakage of the projections.

Figure 11:
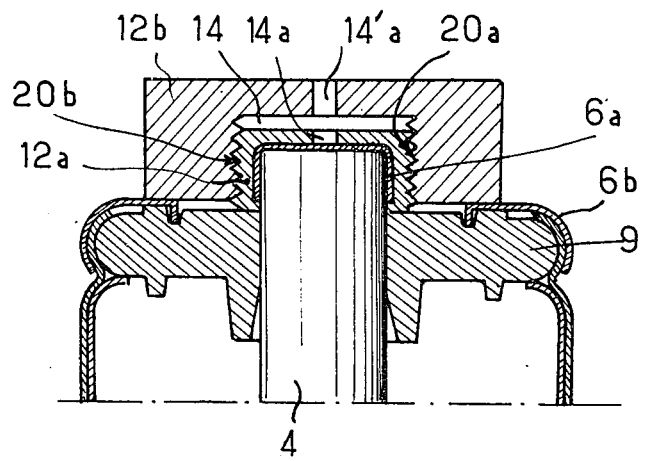

In the case of the embodiment of FIG. 11, the protective element is in two parts 12a and 12b. The part 12a is moulded on to the cap 6a and carries a thread 20 on its outer face. Moulding is effected in such a manner that the plastics material extends beyond the lower edge of the cap 6a. The part 12b comprises a recess 14 on the inner wall of which there is also provided a thread 20b cooperating with the first thread 20. The two parts 12a and 12b of the protective element which each have a channel 14a and 14'a in alignment with each other are connected by being screwed together.

To remove the protective element, it is sufficient to turn the piece 12b so as to screw it down on the piece 12a. The result is that a force is exerted on the plastics material arranged between the cap 6a and the cover 9 which then breaks.

Figure 12:
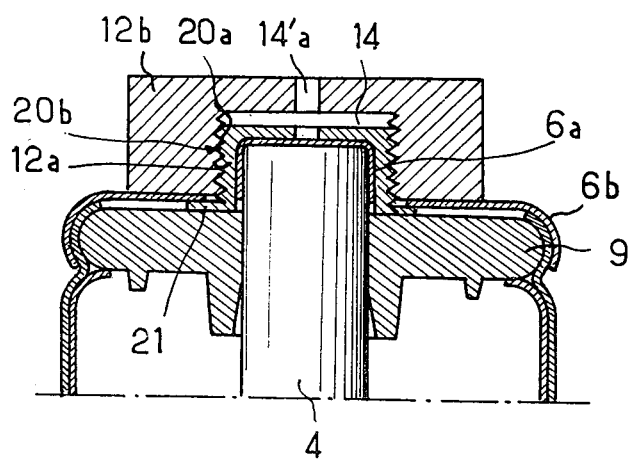

Finally, the embodiment shown in FIG. 12 differs from that in FIG. 11 in that the part 12a is not moulded to the cap 6a, but comprises a base 21 supported below the dish 6b, which renders the part 12a integral with the cell. As in the case of FIG. 11, the part 12b of the protective element is screwed on to the part 12a.

To remove the protective element, it is sufficient to turn the piece 12b again so as to screw it down on the piece 12a. As a result of the force exerted on the base, the latter breaks on a level with the thread 20, said thread being on a level with the base, and the cap 6a therefore becomes accessible and the cell can be used.

It is obvious that the embodiments just described were only intended as examples and that the invention is applicable to generators irrespective of the shape of their upper parts. In particular, the protective element according to the invention is equally suitable for generators, the upper part of which would be formed by a metal piece with a central opening for permitting the passage of the central electrode and which would be the bottom of the inverted metal holder, the cylindrical walls of which would form the exterior of the generator.

I claim:

1. The combination of an energy storage cell and protective element therefor comprising
   a cell having a casing and electrode means exposed at one end thereof for making electrical connection to said cell;
   a generally flat and substantially rigid protective element body of electrically nonconductive material shaped to substantially cover and conceal said electrode means;
   breakable retaining means integrally formed on said body for engaging said cell in locking relationship to prevent removal of said body without breakage of said retaining means; and
   means at the electrode end of said casing for engaging said retaining means,
   said electrode means including a central electrode having a portion protruding from one end of said casing and said casing includes a disk shaped plate surrounding said protruding portions;
   wherein said means for engaging said retaining means comprises a plurality of apertures through said plate;
   and wherein said retaining means comprises a plurality of deformable projections extending from said body through said apertures.

2. A combination according to claim 1 wherein said casing includes a second cover member extending substantially parallel to said plate to limit the penetration of said projections and cause deformation thereof.

3. A combination according to claim 1 wherein said body includes a central recess to receive said protruding portion,
   and wherein said projections are inwardly spaced from the periphery of said body.

4. The combination of an energy storage cell and protective element therefor comprising a cell having a casing and electrode means exposed at one end thereof for making electrical connection to said cell;

a generally flat and substantially rigid protective element body of electrically nonconductive material shaped to substantially cover and conceal said electrode means;

breakable retaining means integrally formed on said body for engaging said cell in locking relationship to prevent removal of said body without breakage of said retaining means; and means at the electrode end of said casing for engaging said retaining means, wherein said electrode means includes a central electrode having a portion protruding from one end of said casing, said body includes a central recess to receive said protruding portion, and said casing includes an end plate;

and wherein said means for engaging comprises a central opening in said end plate surrounding said protruding portion and defining a gap to receive said retaining means.

5. The combination of an energy storage cell and protective element therefor comprising a cell having a casing and electrode means exposed at one end thereof for making electrical connection to said cell;

a generally flat and substantially rigid protective element body of electrically nonconductive material shaped to substantially cover and conceal said electrode means;

breakable retaining means integrally formed on said body for engaging said cell in locking relationship to prevent removal of said body without breakage of said retaining means; and means at the electrode end of said casing for engaging said retaining means, wherein said electrode means includes a central electrode having a portion protruding from one end of said casing, said protruding portion has a plurality of inwardly extending recesses, and said body includes a central recess to receive said protruding portion and a plurality of projections extending into said inwardly extending recesses.

6. The combination of an energy storage cell and protective element therefor comprising a cell having a casing and electrode means exposed at one end thereof for making electrical connection to said cell, said electrode means including a central electrode having a portion protruding from one end of said casing;

a generally flat and substantially rigid protective element body of electrically nonconductive material shaped to substantially cover and conceal said electrode means, said body having a portion of reduced thickness near the line of contact with said electrode;

breakable retaining means integrally formed on said body for engaging said cell in locking relationship to prevent removal of said body without breakage of said retaining means, said retaining means comprising a portion of said body covering said cap and contacting said electrode to engage the cap; and means at the electrode end of said casing for engaging said retaining means, said means for engaging including an end cap partially covering the distal end of said protruding portion.

7. The combination of an energy storage cell and protective element therefor comprising a cell having a casing and electrode means exposed at one end thereof for making electrical connection to said cell, said electrode means including a central electrode having a portion protruding from one end of said casing;

a generally flat and substantially rigid protective element body of electrically nonconductive material shaped to substantially cover and conceal said electrode means;

breakable retaining means integrally formed on said body for engaging said cell in locking relationship to prevent removal of said body without breakage of said retaining means; and means at the electrode end of said casing for engaging said retaining means, said means for engaging including an end cap partially covering the distal end of said protruding portion, said cap including an outwardly extending flange having a plurality of openings to receive said retaining means.

8. The combination of an energy storage cell and protective element therefor comprising a cell having a casing and electrode means exposed at one end thereof for making electrical connection to said cell;

a generally flat and substantially rigid protective element body of electrically nonconductive material shaped to substantially cover and conceal said electrode means;

breakable retaining means integrally formed on said body for engaging said cell in locking relationship to prevent removal of said body without breakage of said retaining means; and means at the electrode end of said casing for engaging said retaining means, wherein said electrode means includes a central electrode having a portion protruding from one end of said casing wherein said means for engaging comprises an end plate of electrically nonconductive material closing said one end of said casing, surrounding said protruding portion and defining an annular axial and radial recess adjacent said portion, and wherein said retaining means comprises an annular wall projecting from said body, said wall being formed with a flange to mate with said axial and radial recess.

9. The combination of an energy storage cell and protective element therefor comprising a cell having a casing and a protruding electrode means exposed at one end thereof for making electrical connection to said cell, said cell having an end wall of electrically nonconductive material surrounding said electrode means, said end wall having a plurality of projections integrally formed thereon, said projection protruding in the direction of said electrode means;

a substantially rigid body of electrically nonconductive material shaped to substantially cover and conceal said electrode means,
    said body having a recess shaped to loosely receive said electrode means and a plurality of additional recesses to receive and mate with said projections; and
means for adhering said projections in said additional recesses.

10. The combination of an energy storage cell and a protective element therefor comprising
    a cell having
        a cylindrical casing;
        a transverse end wall;
        a central electrode having a portion protruding through and beyond said end wall;
        an electrically conductive cap fixedly attached to and covering the end of said protruding portion, said cap extending axially along said electrode and terminating in an edge spaced from said end wall; and
    a protective element comprising
        an inner cylindrical element portion formed to surround and substantially cover said cap and said protruding portion, said inner element having an annular portion extending into the space between said edge and said end wall, the outer surface of said inner portion being threaded; and
        an outer element portion having a central recess internally threaded to mate with the threaded outer surface of said inner portion, the axial depth of said central recess being greater than the axial length of said inner element so that tightening torgue applied to said outer element after said outer element abuts said end wall causes breakage of said annular portion of said inner element.

11. The combination of an energy storage cell and a protective element therefor comprising
    a cell having
        a cylindrical casing;
        a transverse inner end wall of electrically nonconductive material;
        a central electrode having a portion protruding through and beyond said inner end wall;
        an outer end wall having a central opening larger than said electrode to define an annular space, said end walls being axially spaced apart; and
    a protective element comprising
        an inner cylindrical element portion formed to surround and substantially cover said protruding portion of said electrode, said inner element having an annular flange portion extending outwardly into the space between said end walls, the outer surface of said inner portion being threaded; and
        an outer element portion having a control recess internally threaded to mate with the threaded outer surface of said inner portion, the axial depth of said central recess being greater than the axial length of said inner element so that tightening torque applied to said outer element after said outer element abuts said outer end wall causes breakage of said annular flange portion of said inner element.

* * * * *